(12) United States Patent
Kwon et al.

(10) Patent No.: US 11,137,265 B2
(45) Date of Patent: Oct. 5, 2021

(54) AMI MANAGEMENT METHOD FOR OPERATING SMART METER, AND AMI MANAGEMENT SERVER AND RECORDING MEDIUM APPLYING THE SAME

(71) Applicant: Korea Electronics Technology Institute, Seongnam-si (KR)

(72) Inventors: Young Min Kwon, Seongnam-si (KR);
Seung Woo Lee, Seongnam-si (KR);
Hyoung Soo Lee, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 208 days.

(21) Appl. No.: 16/465,832

(22) PCT Filed: Dec. 18, 2017

(86) PCT No.: PCT/KR2017/014930
§ 371 (c)(1),
(2) Date: May 31, 2019

(87) PCT Pub. No.: WO2019/124569
PCT Pub. Date: Jun. 27, 2019

(65) Prior Publication Data
US 2021/0095997 A1    Apr. 1, 2021

(30) Foreign Application Priority Data
Dec. 18, 2017    (KR) .......................... 10-2017-0173791

(51) Int. Cl.
*G01D 4/00*    (2006.01)
*G16Y 10/35*    (2020.01)
(Continued)

(52) U.S. Cl.
CPC .............. *G01D 4/002* (2013.01); *G16Y 10/35* (2020.01); *G16Y 20/30* (2020.01); *G16Y 40/10* (2020.01); *H04M 11/002* (2013.01)

(58) Field of Classification Search
None
See application file for complete search history.

(56) References Cited

U.S. PATENT DOCUMENTS

2007/0257813 A1* 11/2007 Vaswani ................ G01D 4/004
340/870.02
2011/0074598 A1*  3/2011 Cornwall ............... G01D 4/002
340/870.01
(Continued)

FOREIGN PATENT DOCUMENTS

| JP | 2010-130168 A | 6/2010 |
| KR | 10-2012-0035351 A | 4/2012 |
| KR | 10-1196287 B1 | 11/2012 |

OTHER PUBLICATIONS

Korean Office Action dated Nov. 16, 2018, in connection with the Korean Patent Application No. 10-2017-0173791 citing the above reference(s).

*Primary Examiner* — Curtis A Kuntz
*Assistant Examiner* — Jerold B Murphy
(74) *Attorney, Agent, or Firm* — Hauptman Ham, LLP

(57) ABSTRACT

An AMI management method, and an AMI management server and a recording medium applying the same are provided. According to the AMI management method, the AMI management server managing an AMI stores customer information including a customer ID and information regarding a meter corresponding to a corresponding customer, requests an AMI platform to generate a service, maps AMI platform information received from the AMI platform as a response to the request onto the customer information, and transmits mapping information including the mapped
(Continued)

information to the AMI platform. Accordingly, remote metering can be performed by using IoT communications of various telecommunications operators by using the AMI platform.

8 Claims, 5 Drawing Sheets

(51) Int. Cl.
*G06Q 20/30* (2012.01)
*G06Q 50/06* (2012.01)
*G16Y 40/10* (2020.01)
*G16Y 20/30* (2020.01)
*H04M 11/00* (2006.01)

(56) References Cited

U.S. PATENT DOCUMENTS

| | | | |
|---|---|---|---|
| 2011/0225072 A1* | 9/2011 | Sewell | G06Q 50/06 705/30 |
| 2012/0126994 A1* | 5/2012 | Sobotka | G01R 19/165 340/870.02 |
| 2012/0299744 A1* | 11/2012 | Sfaelos | H04Q 9/00 340/870.02 |
| 2013/0232556 A1* | 9/2013 | Tan | H04L 63/0876 726/4 |
| 2014/0095245 A1* | 4/2014 | Walsh | G06Q 10/06315 705/7.25 |
| 2014/0097965 A1* | 4/2014 | Bharat | G01D 4/002 340/870.02 |
| 2016/0163177 A1* | 6/2016 | Klicpera | G08B 21/18 137/59 |
| 2018/0049156 A1* | 2/2018 | Laha | H04W 76/40 |

* cited by examiner

AMI MANAGEMENT METHOD FOR OPERATING SMART METER, AND AMI MANAGEMENT SERVER AND RECORDING MEDIUM APPLYING THE SAME

TECHNICAL FIELD

The present disclosure relates an advanced metering infrastructure (AMI) management method, and an AMI management server and a recording medium applying the same, and more particularly, to an AMI management method for operating a smart meter in an AMI system, and an AMI management server and a recording medium applying the same.

BACKGROUND ART

The information disclosed herein is presented as background information only to assist with an understanding of embodiments, and is not applicable as prior art.

Since city gas was supplied in 1987, meters have been being distributed, used, and managed in similar ways. Most of the 17.2 million households throughout the country are using mechanical meters without communication functions. In the case of the mechanical meters, meterman should directly visit to read the meters.

However, with the increase of one-person households and dual-income households (50% or more of total households), the efficiency of reading/safety checking is reduced, and as invasion of privacy and the crime of posing as a meterman cause social problems, it is becoming harder for metermen to visit and read meters.

A self-reading and an estimated reading based on previous usage are used as other methods to read meters, but civil complaints related thereto continuously arise.

In addition, integrated remote metering systems are applied to some apartment houses, but are managed separately from billing/managing systems of utilities (gas corporations), and are managed by periodically moving data of remote metering servers in apartment houses to portable storage devices by metermen.

Therefore, there is a demand for a method for metering gas or water more easily.

DISCLOSURE

Technical Problem

The present disclosure has been developed in order to address the above-discussed deficiencies of the prior art, and an object of the present disclosure is to provide an AMI management method of an AMI management server managing an AMI, and an AMI management server and a recording medium applying the same, wherein the AMI management method includes: storing customer information including a customer ID and information regarding a meter corresponding to a corresponding customer; requesting an AMI platform to generate a service; mapping AMI platform information received from the AMI platform as a response to the request onto the customer information; and transmitting mapping information including the mapped information to the AMI platform.

The technical objects that can be achieved by the present disclosure are not limited to those mentioned in the above, and other technical objects that are not mentioned herein can be clearly understood by a person skilled in the art based on the following descriptions.

Technical Solution

According to an embodiment of the present disclosure to achieve the above-described objects, an AMI management method of an AMI management server which manages an AMI includes: storing customer information including a customer ID and information regarding a meter corresponding to a corresponding customer; requesting an AMI platform to generate a service; mapping AMI platform information received from the AMI platform as a response to the request onto the customer information; and transmitting mapping information including the mapped information to the AMI platform.

In addition, the customer information may include the customer ID, a meter ID, and a network ID.

In addition, the method may further include transmitting a service opening request to a telecommunications operator, and the mapping may include additionally mapping telecommunications operator information received from the telecommunications operator as a response to the service opening request onto the customer information.

In addition, the AMI platform information may include a platform AE-ID, the telecommunications operator information may include a telecommunications operator AE-ID, and the mapping information may include a network ID, the platform AE-ID, and the telecommunications operator AE-ID.

In addition, the mapping information may further include the customer ID and a meter ID.

In addition, the method may further include transmitting the mapping information and metering time information to the meter.

In addition, the meter may meter by using the mapping information and the metering time information, and may periodically transmit metering information to the AMI platform.

In addition, the method may further include requesting the AMI platform to retrieve metering information and receiving the metering information from the AMI platform as a response to the request.

In addition, the method may further include, when a change of a metering value of a corresponding period included in the received metering information exceeds a threshold value, changing the metering time information to shorten a metering interval, and transmitting the changed metering time information to the meter.

According to an embodiment of the present disclosure, an AMI management server for managing an AMI includes: a communication unit configured to communicate with a meter and an AMI platform wiredly or wirelessly; and a control unit configured to control to store customer information including a customer ID and information regarding a meter corresponding to a corresponding customer; to request the AMI platform to generate a service; to map AMI platform information received from the AMI platform as a response to the request onto the customer information; and to transmit mapping information including the mapped information to the AMI platform.

According to an embodiment of the present disclosure, a computer readable recording medium records a computer program performing an AMI management method of an AMI management server which manages an AMI, the method including: storing customer information including a customer ID and information regarding a meter corresponding to a corresponding customer; requesting an AMI platform to generate a service; mapping AMI platform information received from the AMI platform as a response to the request onto the customer information; and transmitting mapping information including the mapped information to the AMI platform.

According to an embodiment of the present disclosure, an AMI management method of an AMI management server which manages an AMI includes: receiving information regarding a meter corresponding to a corresponding customer from a terminal of an installation engineer; storing customer information including a customer ID and the received information regarding the meter; requesting an AMI platform to generate a service; mapping AMI platform information received from the AMI platform as a response to the request onto the customer information; and transmitting mapping information including the mapped information to the AMI platform.

Advantageous Effects

According to various embodiments of the present disclosure, an AMI management method of an AMI management server managing an AMI, which stores customer information including a customer ID and information regarding a meter corresponding to a corresponding customer, requests an AMI platform to generate a service, maps AMI platform information received from the AMI platform as a response to the request onto the customer information, and transmits mapping information including the mapped information to the AMI platform, and an AMI management server and a recording medium applying the same are provided. Accordingly, remote metering can be performed by using IoT communications of various telecommunications operators by using the AMI platform.

The effects that can be achieved by the present disclosure are not limited to those mentioned in the above, and other effects that are not mentioned herein can be clearly understood by a person skilled in the art based on the following descriptions.

DESCRIPTION OF DRAWINGS

For a more complete understanding of the present disclosure, the accompanying drawings, included as a part of the detailed description, provide embodiments of the present disclosure, and explain technical features of the present disclosure in conjunction with the detailed description, in which.

BEST MODE

Figure 1:
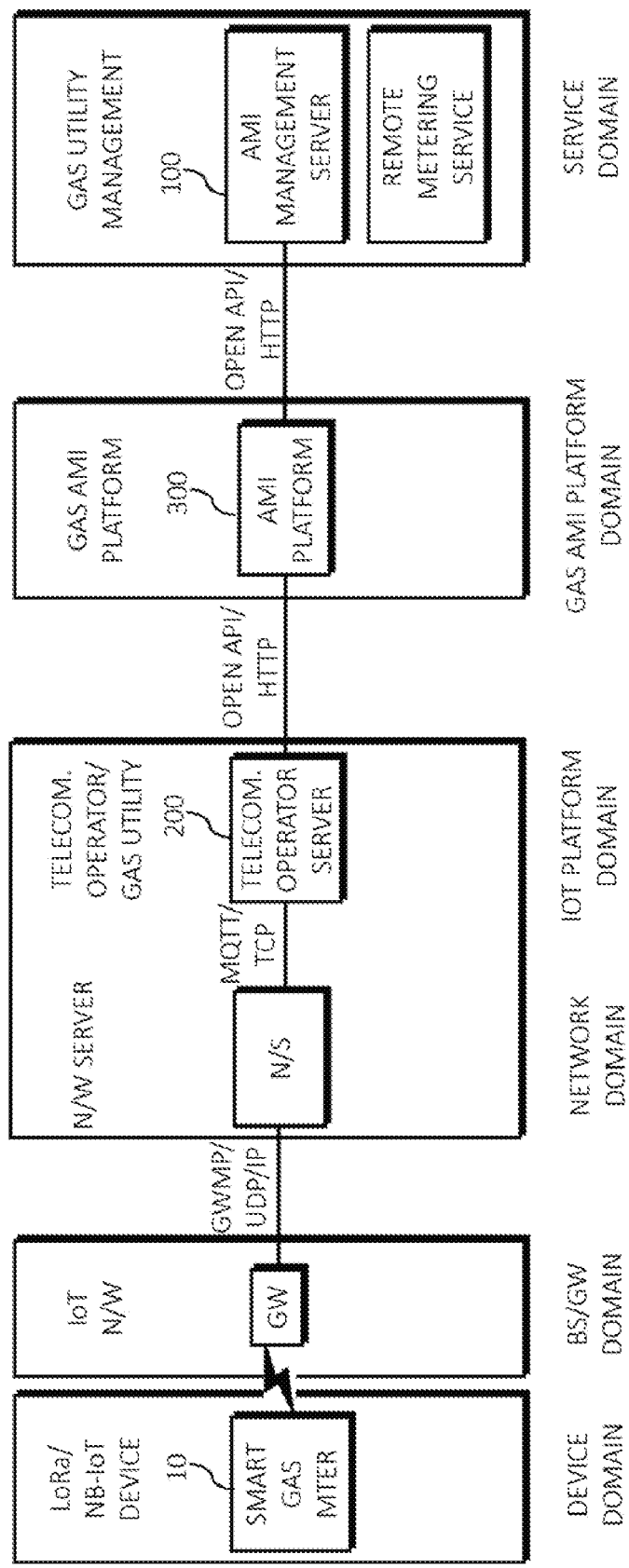
FIG. 1 is a view illustrating an overall configuration of an AMI system according to an embodiment of the present disclosure.

The present disclosure will now be described more fully with reference to specific embodiments of the present disclosure illustrated in the accompanying drawings to clarify features and advantages of the present disclosure.

In the following description and the accompanying drawings, well-known functions or constructions are not described in detail since they would obscure the present disclosure in unnecessary detail. In addition, it should be noted that, throughout the drawings, the same reference numerals are used for the same elements if possible.

Terms or words used in the following description and drawings should not be interpreted as being limited to general and dictionary definitions, and should be interpreted as having definitions and concepts suitable for the technical idea of the present disclosure, based on the principle that the inventors can appropriately define the terms as concepts for explaining their invention in the best method.

Accordingly, the constructions illustrated in the embodiments of the detailed description and the drawings are merely the most preferred embodiment of the present disclosure, and do not represent all technical ideas of the present disclosure. Therefore, the embodiments should be construed as including various equivalents and variations substituted therefor at the time of filing.

The terms such as "first" or "second" used in various embodiments may be used to explain various elements and to distinguish one element from another element, but do not limit the elements. For example, without departing the scope of the present disclosure, a second element may be referred to as a first element, and similarly, a first element may be referred to as a second element.

It will be understood that when an element is referred to as being "coupled to" or "connected to" another element, it can be logically or physically coupled or connected to another element.

In other words, an element may be directly coupled or connected to another element, but there may be an intervening element therebetween or the element may be indirectly coupled or connected to another element.

The terms "include" or "have" used in the detailed description indicate the presence of features, numbers, steps, operations, elements, components or a combination thereof described in the detailed description, and do not preclude the presence or addition of one or more other features, numbers, steps, operations, elements, components, or a combination thereof.

The terms "unit" and "module" and the terms having suffix "-er" or "-or" used in the detailed description refer to a unit for processing at least one function or operation, and may be implemented by hardware, software, or a combination of hardware and software.

As used herein, the terms "a", "an," "one," "the," and similar terms thereto are intended to include the singular forms and the plural forms, unless the context describing the present disclosure (in particular, the context of claims presented below) clearly indicates otherwise.

Hereinafter, the present disclosure will be described in detail with reference to the accompanying drawings.

FIG. 1 is a view illustrating an overall configuration of an AMI system according to an embodiment of the present disclosure. The AMI indicates an intelligent metering infrastructure for developing metering information and establishing an active metering management system by applying ICT converging technology to metering systems.

As shown in FIG. 1, when a meter 10 such as a smart gas meter performs metering in the AMI system, metering information is transmitted to a telecommunications operator server 200 via a gateway (GW) of an IoT network and a network server system (N/S), and the telecommunications operator server 200 transmits the metering information to an AMI platform 300. Then, an AMI management server 100 of a gas utility for managing the AMI receives the metering information from the AMI platform 300 and is enabled to provide a remote metering service.

Herein, the meter 10 is a smart meter that is connected with the IoT network to be able to transmit metering information, and may be connected with various IoT networks such as a long range (LoRa) network (LoRa wide area network (LoRa WAN)) or a narrowband Internet of Things (NB-IoT) network. In addition, the meter 10 meters various objects need to be metered, such as gas, electricity, water, etc., and generates metering information related to the metering object and transmits the metering information via the IoT network.

The telecommunications operator server 200 is a server that is managed by a telecommunications operator to provide an IoT network service, and may correspond to a server that is provided by various mobile communications operators such as SK Telecom, KT, LG Uplus, etc.

The AMI platform 300 receives the metering information from the meter 10 via the IoT network. In this case, the AMI platform 300 is compatible with various IoT networks which are managed by various communications operators, and receives a variety of metering information received from the plurality of meters 10 and stores the information in a database. In addition, the AMI platform 300 may provide various retrieving functions to enable an AMI manager to retrieve metering information in a desired form.

The AMI management server 100 may manage the plurality of meters 10 included in the AMI system, and may receive and manage a variety of metering information by using the AMI platform 300. Detailed functions of the AMI management server 100 will be described hereinbelow with reference to FIGS. 2 to 6.

Figure 2:
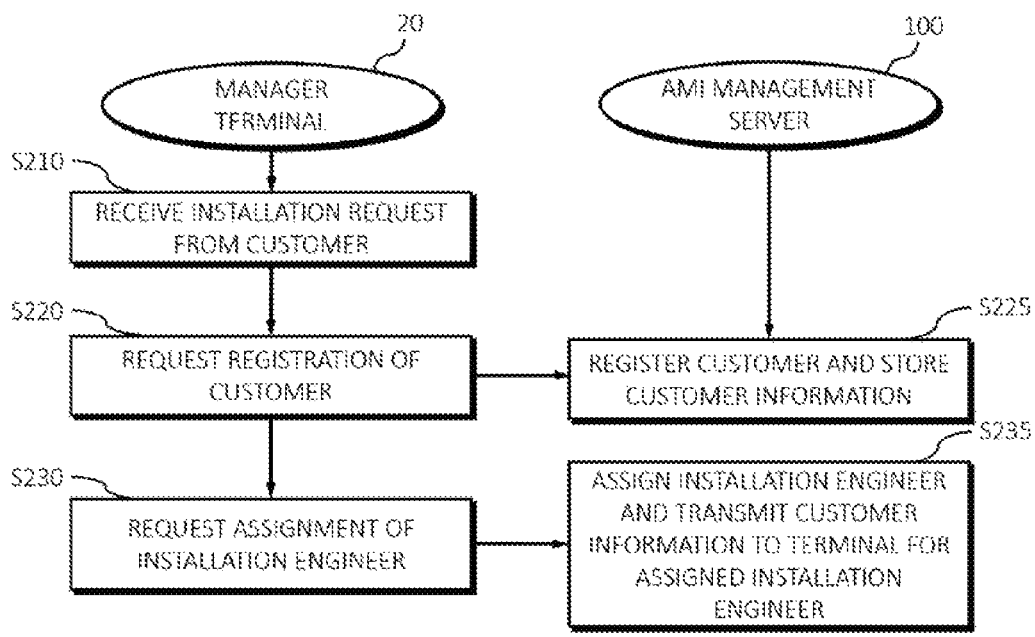
FIG. 2 is a flowchart provided to explain a process of performing a meter installation request by an AMI management method according to an embodiment of the present disclosure.

FIG. 2 is a flowchart provided to explain a process of performing a meter installation request by an AMI management method according to an embodiment of the present disclosure. In FIG. 2, a manager terminal 20 indicates a terminal that is used by an AMI manager.

When a meter installation request is received from a customer (S210), the manager terminal 20 receives an input of information of the customer and requests the AMI management server 100 to register the corresponding customer (S220). In this case, the manager terminal 20 transmits the inputted customer information along with the customer registration request. Herein, the customer information is information regarding a customer, and may include a customer ID, a customer name, a customer address, a customer phone number, etc.

Then, the AMI management server 100 register the customer by using the received customer information, and stores the received customer information (S225).

Thereafter, the manager terminal 20 requests the AMI manager server 100 to assign an installation engineer for the meter 10 (S230). Then, the AMI management server 100 assigns an installation engineer and transmits the customer information to the terminal of the assigned installation engineer (235).

Through the above-described process, the AMI management server 100 performs the meter installation request. Then, the AMI management server 100 performs a process of FIG. 3.

Figure 3:
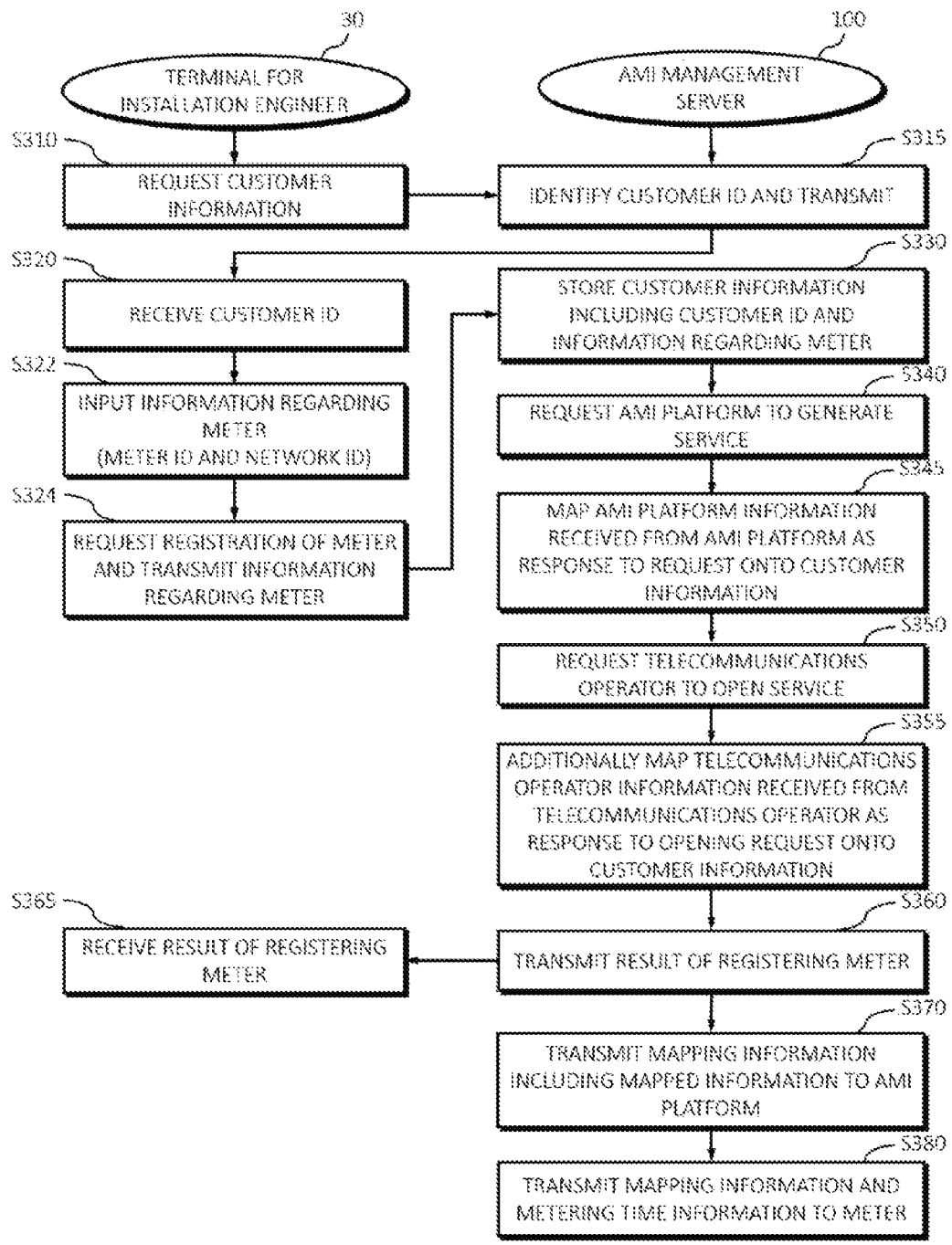
FIG. 3 is a flowchart provided to explain a process of registering a meter by the AMI management method according to an embodiment of the present disclosure.

FIG. 3 is a flowchart provided to explain a process of registering a meter by the AMI management method according to an embodiment of the present disclosure. In FIG. 3, a terminal 30 for an installation engineer is a terminal that is used by an installation engineer who installs the meter 10, and is used for the installation engineer to input information regarding the installed meter 10.

The installation engineer terminal 30 requests the customer information regarding the meter 10 to be installed from the AMI management server 100 (S310). Then, the AMI management server 100 may identify the customer ID of the customer information and transmits the customer ID to the installation engineer terminal 30 (S315). Then, the installation engineer terminal 30 receives the customer ID (S320).

Then, the installation engineer terminal 30 may receive an input of information regarding the meter corresponding to the customer ID from the installation engineer (S322). Herein, the information regarding the meter 10 is information regarding the meter to be installed, and includes a meter ID and a network ID. The meter ID indicates a value corresponding to a unique ID of the meter, and may be arbitrarily determined by the installation engineer or may be already determined when the meter is produced. The network ID is a network-related ID of a communication module included in the meter 10, and may be, for example, a media access control (MAC) address of the communication module included in the meter 10.

In addition, the installation engineer terminal 30 requests the AMI management server 100 to register the installed meter, and transmits the information regarding the meter 10 (S324).

Then, the AMI management server 100 receives the customer ID and the information regarding the meter corresponding to the customer, and stores customer information including the customer ID and the information regarding the meter (S330). Herein, the customer information includes not only the information regarding the customer, but also, the information regarding the meter corresponding to the customer, and specifically, may include the customer ID, the customer name, the customer address, the customer phone number, the meter ID, and the network ID.

Thereafter, the AMI management server 100 requests the AMI platform 300 to generate a service (S340). Herein, the service is a service that is provided by the AMI platform 300 to meter remotely. The AMI management server 100 transmits the meter ID to the AMI platform 300 when requesting generation of the service.

In addition, the AMI management server 100 maps AMI platform information received from the AMI platform in response to the request onto the customer information (S345). Herein, the AMI platform information is information that is necessary for using the function of the AMI platform, and may include a platform application entity (AE)-ID.

Thereafter, the AMI management server 100 transmits a service opening request regarding the communication module included in the installed meter 10 to the telecommunications operator server 200 (S350). Since the meter 10 should use an IoT network provided by a telecommunications operator, the AMI management server 100 requests the telecommunication operator to open the service to enable the meter 10 to access the IoT network. The AMI management server 100 transmits the network ID of the meter 10 to the telecommunications operator server 200 when requesting opening of the service.

Then, the telecommunications operator server 200 opens the access of the meter 10 to the IoT network, and the AMI management server 100 additionally maps telecommunications operator information received from the telecommunications operator server 200 in response to the service opening request onto the customer information (S355). Herein, the telecommunications operator information is information necessary for the meter 10 to access the IoT network of the corresponding telecommunications operator, and includes a telecommunications operator AE-ID.

Thereafter, the AMI management server 100 transmits a result of registering the meter 10 to the installation engineer terminal 30 (S360). Then, the installation engineer terminal 30 receives the result of registering the meter 10 (S365), and displays a relevant message on a screen in order for the meter installation engineer to identify the result.

In addition, the AMI management server 100 transmits mapping information including the mapped information to the AMI platform (S370). Herein, the mapping information indicates the information mapped onto the customer information, and includes the network ID, the platform AE-ID, and the telecommunications operator AE-ID. In addition, the mapping information may further include the customer ID and the meter ID.

In addition, the AMI management server 100 transmits the mapping information and metering time information to the meter 10 (S380). Herein, the metering time information indicates a time when the meter 10 meters, and includes a metering period. For example, the metering time information may be information such as "at 9 a.m. every day," "at 10 a.m. on Monday, Wednesday, and Friday", etc.

Through the above-described process, the AMI management server 100 registers the newly installed meter 10.

Figure 4:
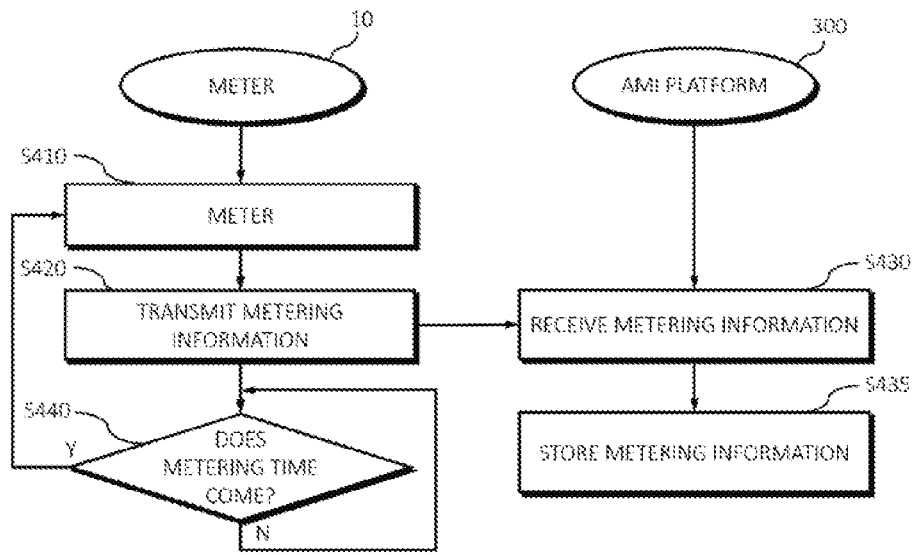
FIG. 4 is a flowchart provided to explain a process of transmitting, by a meter, metering information by the AMI management method according to an embodiment of the present disclosure.

FIG. 4 is a flowchart provided to explain a process of transmitting, by the meter, metering information according to the AMI management method according to an embodiment of the present disclosure.

The meter 10 meters by using the mapping information and the metering time information (S410), and transmits metering information to the AMI platform (S420). Then, the AMI platform 300 receives the metering information (S430) and stores the received metering information (S435).

The meter 10 identifies whether a metering time comes (S440). When the metering time does not come (S440—N), the meter 10 waits, and, when the metering time comes (S440—Y), the meter 10 meters (S410).

Through the above-described process, the meter 10 meters and transmits metering information to the AMI platform 300.

Figure 5:
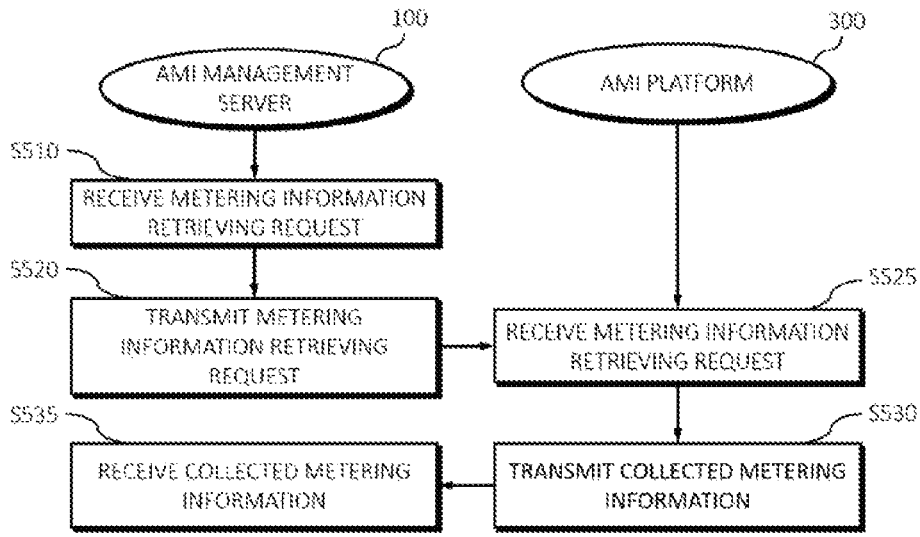
FIG. 5 is a flowchart provided to explain a process of retrieving metering information by the AMI management method according to an embodiment of the present disclosure.

FIG. 5 is a flowchart provided to explain a process of retrieving metering information by the AMI management method according to an embodiment of the present disclosure.

When the AMI management server 100 receives a metering information retrieving request from the manager terminal 20 (S510), the AMI management server 100 transmits the metering information retrieving request to the AMI platform 300 (S520). Then, the AMI platform 300 receives the metering information retrieving request (S525), and transmits collected metering information to the AMI management server 100 (S530).

Then, the AMI management server 100 receives the metering information from the AMI platform 300 as a response to the request (S535).

In this case, when a change of a metering value of a corresponding period included in the received metering information exceeds a threshold value, the AMI management server 100 may change the metering time information to shorten a metering interval, and may transmit the changed metering time information to the meter 10. By shortening a metering interval when a change of a metering value is great as described above, the AMI management server 100 can identify the change of the metering value more precisely.

Through the above-described process, the AMI management server 100 can retrieve the metering information.

Figure 6:
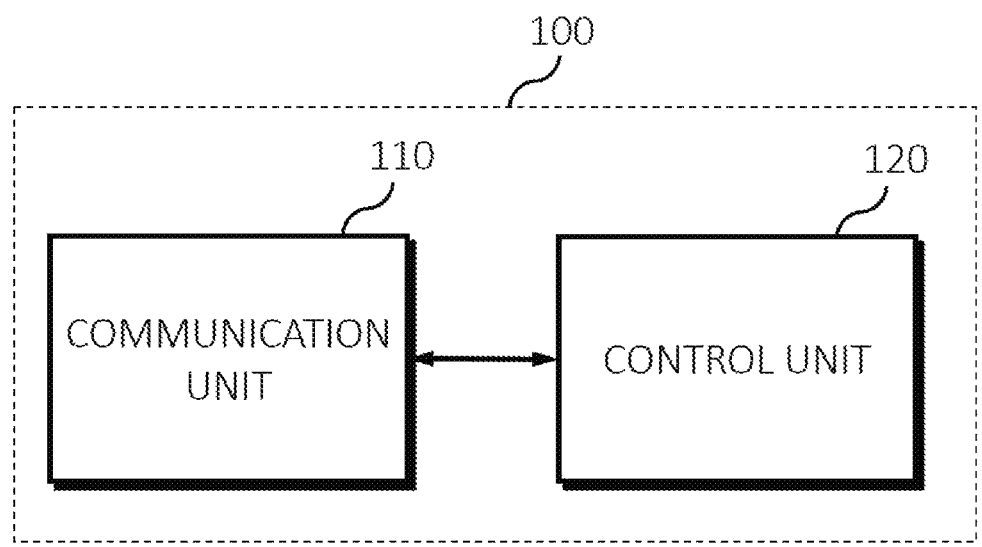
FIG. 6 is a block diagram illustrating a schematic structure of an AMI management server according to an embodiment of the present disclosure.

FIG. 6 is a block diagram illustrating a schematic configuration of the AMI management server 100 according to an embodiment of the present disclosure.

The AMI management server 100 illustrated in FIG. 6 may be connected with the meter 10 and the AMI platform 300 to be able to communicate therewith wiredly or wirelessly, and performs a function of managing the AMI system including the plurality of meters 10 by using the AMI platform 300. The AMI management server 100 is not limited to a server computer although its name is the server, and any device that can manage general PCs or IoT networks is applicable. As shown in FIG. 6, the AMI management server 100 includes a communication unit 110 and a control unit 120.

The communication unit 110 communicates with the meter 10 and the AMI platform 300 wiredly or wirelessly.

The control unit 120 controls an overall operation of the AMI management server 100. Specifically, the control unit 120 controls to store customer information including a customer ID and information regarding a meter corresponding to the corresponding customer, to request the AMI platform to generate a service, to map AMI platform information received from the AMI platform in response to the request onto the customer information, and to transmit mapping information including the mapped information to the AMI platform. Accordingly, the control unit 120 may control the AMI management server 100 to operate as described above.

The AMI management server 100 of the above-described configuration manages the AMI through the AMI platform 300.

The technical idea of the present disclosure may be applied to a computer-readable recording medium which records a computer program for performing the function of the AMI management server 100 and the AMI management method according to the present embodiments. In addition, the technical idea according to various embodiments of the present disclosure may be implemented in the form of a computer-readable programming language code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, a flash memory, a solid state disk (SSD), or the like. A computer-readable code or program that is stored in the computer readable recording medium may be transmitted via a network connected between computers.

Although the detailed description and drawings describe a configuration of an exemplary device, an implemented thing of an functional operation and a subject explained in the detailed description may be implemented by different types of digital electronic circuits, or may be implemented by computer software, firmware, or hardware including the structure disclosed in the detailed description and a structural equivalent thereto, or may be implemented by a combination of one or more of computer software, firmware, or hardware.

Accordingly, while exemplary embodiments have been particularly shown and described above, it will be understood by those of ordinary skill in the art that various changes in form and details may be made therein without departing from the spirit and scope.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. An AMI management method of an AMI management server which manages an AMI, the AMI management server including a control unit and a communication unit communicating with a meter and an AMI platform wiredly or wirelessly, the method comprising:
    storing customer information comprising a customer ID and information regarding the meter corresponding to a corresponding customer;
    creating mapped information by mapping, by the control unit, AMI platform information received from the AMI platform onto the customer information;
    transmitting, by the control unit, mapping information comprising the mapped information to the AMI platform; and
    transmitting the mapping information and metering time information to the meter, wherein
    the meter is configured to meter by using the mapping information and the metering time information, and to periodically transmit metering information to the AMI platform,
    the method further comprises: receiving metering information from the AMI platform; and when a change of a metering value of a corresponding period included in the received metering information exceeds a threshold value,
    changing the metering time information to shorten a metering interval, and
    transmitting the changed metering time information to the meter.

2. The method of claim 1, wherein the customer information comprises the customer ID, a meter ID, and a network ID.

3. The method of claim 1, further comprising transmitting a service opening request to a telecommunications operator, wherein the mapping comprises additionally mapping telecommunications operator information received from the telecommunications operator as a response to the service opening request onto the customer information.

4. The method of claim 3, wherein the AMI platform information comprises a platform application entity ID, wherein the telecommunications operator information comprises an telecommunications operator application entity ID, and wherein the mapping information comprises a network ID, the platform application entity ID, and the telecommunications operator application entity ID.

5. The method of claim 4, wherein the mapping information further comprises the customer ID and a meter ID.

6. An AMI management server for managing an AMI the management server comprising:
    a communication unit configured to communicate with a meter and an AMI platform wiredly or wirelessly; and
    a control unit configured
    to control to store customer information comprising a customer ID and information regarding the meter corresponding to a corresponding customer;
    to map AMI platform information received from the AMI platform onto the customer information, creating mapped information;
    to transmit mapping information comprising the mapped information to the AMI platform; and
    to transmit the mapping information and metering time information to the meter, wherein
    the meter is configured to meter by using the mapping information and the metering time information, and to periodically transmit metering information to the AMI platform, and the control unit is further configured to
    receive metering information from the AMI platform, and when a change of a metering value of a corresponding period included in the received metering information exceeds a threshold value,
    change the metering time information to shorten a metering interval,
    and transmitting the changed metering time information to the meter.

7. A non-transitory computer readable recording medium which records a computer program performing an AMI management method of an AMI management server which manages an AMI, the method comprising:
    storing customer information comprising a customer ID and information regarding a meter corresponding to a corresponding customer;
    creating mapped information by mapping AMI platform information received from the AMI platform onto the customer information;
    and transmitting mapping information comprising the mapped information to the AMI platform;
    and transmitting the mapping information and metering time information to the meter, wherein
    the meter is configured to meter by using the mapping information and the metering time information, and to periodically transmit metering information to the AMI platform, and
    the method further comprises:
    receiving metering information from the AMI platform, and when a change of a metering value of a corresponding period included in the received metering information exceeds a threshold value,
    changing the metering time information to shorten a metering interval, and
    transmitting the changed metering time information to the meter.

8. An AMI management method of an AMI management server which manages an AMI, the AMI management server including a control unit and a communication unit communicating with a meter and an AMI platform wiredly or wirelessly, the method comprising:
    receiving, by the communication unit, information regarding the meter corresponding to a corresponding customer from a terminal of an installation engineer;
    storing customer information comprising a customer ID and the received information regarding the meter;
    creating mapped information by mapping, by the control unit, AMI platform information received from the AMI platform onto the customer information;

transmitting, by the control unit, mapping information comprising the mapped information to the AMI platform; and transmitting the mapping information and metering time information to the meter, wherein the meter is configured to meter by using the mapping information and the metering time information, and to periodically transmit metering information to the AMI platform, and the method further comprises:

receiving metering information from the AMI platform, and when a change of a metering value of a corresponding period included in the received metering information exceeds a threshold value, changing the metering time information to shorten a metering interval, and transmitting the changed metering time information to the meter.

* * * * *